US009472070B2

(12) United States Patent
Chen (10) Patent No.: US 9,472,070 B2
(45) Date of Patent: *Oct. 18, 2016

(54) MULTIPLE DETECTION FUNCTION MODULARIZED LIGHTING DEVICE

(71) Applicant: Kaipo Chen, Taoyuan (TW)

(72) Inventor: Kaipo Chen, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,992

(22) Filed: May 8, 2015

(65) Prior Publication Data

US 2015/0243143 A1  Aug. 27, 2015

Related U.S. Application Data

(63) Continuation-in-part of application No. 13/220,720, filed on Aug. 30, 2011, now Pat. No. 9,228,731.

(30) Foreign Application Priority Data

Apr. 7, 2015 (CN) .......................... 2015 1 0160210

(51) Int. Cl.
| | |
|---|---|
| *G08B 13/196* | (2006.01) |
| *F21V 21/30* | (2006.01) |
| *G08B 21/14* | (2006.01) |
| *F21V 23/04* | (2006.01) |
| *H04N 7/18* | (2006.01) |
| *F21V 33/00* | (2006.01) |
| *G08B 15/00* | (2006.01) |
| *G08B 5/36* | (2006.01) |

(52) U.S. Cl.
CPC ......... *G08B 13/19617* (2013.01); *F21V 21/30* (2013.01); *F21V 23/0464* (2013.01); *F21V 23/0471* (2013.01); *F21V 23/0478* (2013.01); *F21V 33/0052* (2013.01); *G08B 13/19619* (2013.01); *G08B 21/14* (2013.01); *H04N 7/183* (2013.01); *G08B 5/36* (2013.01); *G08B 13/19695* (2013.01); *G08B 15/001* (2013.01)

(58) Field of Classification Search
None
See application file for complete search history.

(56) References Cited

U.S. PATENT DOCUMENTS

| | | | | |
|---|---|---|---|---|
| 4,896,145 A | * | 1/1990 | Lewkowicz | ........ F21V 33/0076 307/66 |
| 6,812,970 B1 | * | 11/2004 | McBride | .......... G08B 13/19619 348/151 |
| 6,820,998 B2 | * | 11/2004 | Chen | ....................... F21K 9/135 362/249.05 |

(Continued)

FOREIGN PATENT DOCUMENTS

| | | |
|---|---|---|
| EP | 2570723 B1 | 3/2013 |
| JP | 5481652 B | 4/2014 |

*Primary Examiner* — David N Werner
(74) *Attorney, Agent, or Firm* — Leong C. Lei (57) ABSTRACT

A multiple detection function modularized lighting device includes a substrate on which a photographing module is mounted and also includes an indication module, a detection module, an alarm module, and an LED module that are circumferentially arranged as an annular array along a circumference of the photographing module so that the number of all components can be simplified and integrated on the substrate. An opposite side of the substrate includes a control module mounted thereon to drive all the previous modules. The photographing module and the detection module are received and housed in isolation hoods, which are arranged, through an upper housing member having a plurality of positioning holes being mounted atop a lower casing housing member, to have the photographing module and the detection module embedded in the positioning holes so that the modules on the substrate are respectively set in independent areas defined in the upper housing member.

6 Claims, 12 Drawing Sheets

(56) References Cited

U.S. PATENT DOCUMENTS

| | | | |
|---|---|---|---|
| 6,975,220 B1 * | 12/2005 | Foodman et al. | G06F 17/3089 340/506 |
| 7,327,254 B2 * | 2/2008 | Chen | F21K 9/13 340/321 |
| 8,066,392 B2 * | 11/2011 | Wang | F21S 9/022 362/20 |
| 8,456,568 B2 * | 6/2013 | Wendt | F21V 14/02 348/370 |
| 8,820,961 B2 * | 9/2014 | Kim | F21S 8/086 348/143 |
| 9,228,731 B2 * | 1/2016 | Chen | H04N 7/183 |
| 2004/0201989 A1 * | 10/2004 | Raskas | H04N 5/2256 362/253 |
| 2008/0177646 A1 * | 7/2008 | Frink | G06Q 10/1091 705/32 |
| 2009/0310342 A1 * | 12/2009 | Chang | F21L 4/027 362/205 |
| 2010/0148672 A1 * | 6/2010 | Hopper | F21V 23/0435 315/113 |

* cited by examiner

MULTIPLE DETECTION FUNCTION MODULARIZED LIGHTING DEVICE

CROSS REFERENCE TO RELATED APPLICATION

This is a continuation-in-part of co-pending U.S. patent application Ser. No. 13/220,720 filed on Aug. 30, 2011 and owned by the present applicant.

(a) TECHNICAL FIELD OF THE INVENTION

The present invention generally relates to a multiple detection function modularized lighting device, in which various modules are simplified and integrated with a substrate, which when combined with a housing, allows the modules to be arranged in independent areas to achieve the purpose of stabilizing the operations of the modules.

(b) DESCRIPTION OF THE PRIOR ART

A lighting fixture that uses LED (Light-Emitting Diode), has various advantages of energy saving, extension of lifespan, and high brightness and is thus widely used in household and workshop applications. To simulate the desire of purchase, various multi-functional compound lighting devices are available in the market, of which the functions generally include temperature detection, gas detection, and remote control. The components of these lighting devices are complicated and maintenance is difficult. Further, the LEDs used in these lighting devices are generally for short interval illumination and reminder. A compound LED product of this kind that provides long interval lighting has not been available heretofore.

The primary cause may be such that a conventional compound product of the kind discussed above may have a bulky size if a component for detection purposes is included and this is even worse for the inclusion of multiple detection components. In addition, the reason that no lighting device can be made in this way is that a long term use of an LED would generate a high temperature, which may affect the accuracy of detection and lead to a fault result of detection. The present inventor has been involved in the business of LED manufacture and has carefully studied a sensing lighting module having a photographing and surveillance function as disclosed in European patent EP2570723 B1 and a sensing lighting module with a photographing surveillance function as disclosed in Japanese patent No. 5481652, both providing a structural arrangement for shielding the light so that a camera is protected from influence resulting from light emitting from an LED. In view of the inconvenience of the prior art, the present invention aims to provide a lighting device that comprises various functions of detection and supports for long term illumination that are achieved on the basis of isolation of light and further achieving simplification of the overall structure through integration of components, so as to suit the needs of users who desire multiple detection functions and long term illumination.

SUMMARY OF THE INVENTION

The primary object of the present invention is to provide a multiple detection function modularized lighting device, which comprises a detection module, a control module, a photographing module, and an LED module that are circumferentially arranged in an annular array for being integrated on a substrate and are securely held in position through mating combination of a lower housing member to an upper housing member, wherein the upper housing member comprises a plurality of positioning holes and is mounted atop the lower housing member to allow the detection module and photographing module that are arranged on the substrate to be completely received and embedded, in combination with isolation hoods of a corresponding number, in the positioning holes for setting the modules in separated independent areas and to provide a lighting device with functions of multiple ways of detection and long term illumination and video recording and also to allow a product supply side to select and change according to different designated purposes of use and also provides an arrangement of rotary spherical seat to achieve adjustment of ranges of detection and video recording, so as to reduce the limitations of environmental conditions for the installation of the lighting device.

Compared to the drawbacks of the prior art, the present invention combines various modules on a substrate as a unitary structure and thus simplifies the overall structure so as to achieve wide applications to various types of lighting device, including a regular LED light bulb, a ceiling light, an embedded light, a fluorescent light tube, an LED panel light, and a wall lamp, to allow for activation of different modules according to different data of detection, and to help overcome the influences resulting from light refraction and high temperature caused by an LED module to maintain normal operations of illumination and detection. Further, a product supply side is allowed to select and change the components of the modules according to different needs so as to achieve configurations of modularization for applications requiring different functions.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a multiple detection function modularized lighting device, which as shown in FIGS. 1-4, generally comprises: a lower housing member (4) for electrical connection with a substrate (3). The lower housing member (4) comprises a base (41) comprising a through hole formed through a center thereof. A pivot joint member (42) that has a front end forming a universal joint (421) is received through the center of the base (41) to couple to a pivoting seat (43) so as to be mounted in the base (41). As such, the pivoting seat (42) is constrained and may be rotated for adjustment of angle thereof. An opposite end of the pivot joint member (42) forms a regular lamp head. The lower housing member (4) also comprises a speaker (44) and a heat sink (45) mounted therein. The heat sink (45) is preferably combined with the lower housing member (4) through injection molding. The heat sink (45) is provided for mating a bottom of the substrate (3) in order to reduce the internal temperature of the lighting device. The substrate (3) comprises a photographing module (32) arranged at a center portion of the substrate (3). Circumferentially arranged along a circumference of the photographing module (32) are an indication module (33), a detection module (34), an alarm module (35), and an LED module (36).

The indication module (33) is generally composed of an air quality indicator (331). The air quality indicator (331) comprises three colors of blue, yellow, and red for indication, where blue indicates air is normal; yellow indicate air is poor; and red indicates air is hazardous. The indication module (33) is operable to activate such indication light in compliance with an air sensor (626).

The detection module (34) is composed of a plurality of sensors (341), which comprise: a gas sensor (342), which functions to detect a harmful gas in the surroundings, such as kitchen gas, monoxide in a bath room, or other harmful gases; a pressure sensor (343), which functions to detect the pressure of the surroundings for being used to detect the change of weather to raining; a temperature/humidity sensor (344), which functions to detect the temperature and humidity of the surrounding environment for being used in adjustment of environmental humidity; a body temperature sensor (345), which functions to detect the body temperature or movement of a person in the surroundings for being used to activate lighting of the LED module (36) or to activate photographing of the photographing module (32); a smoke sensor (346), which functions to detect smoke in the surrounding environment for being used for fire alarm or in an area where smoking is prohibited; an air sensor (347), which functions to detect if the content of suspending particles in the surrounding environment exceeds a predetermined standard for being used to detect harmful fog of the surrounding environment in order to remind a user to wear an oral mask or provide other advice. All the sensors (341) are provided for detecting if the conditions of the surrounding environment meet the criterion of activation in order to transmit data to a control module (31) for decision making and operation performing.

The alarm module (35) is generally composed of a flashing alarm light (351). The flashing alarm light (351) functions to generate red light that flashes for reminder to correspond to the gas sensor and the smoke sensor (346). The alarm module (35) is positioned next to the detection module (34) with a space therebetween to receive a microphone (37) and a setting indicator (38) to be arranged therein. The microphone (37) functions to receive an audio sound, which after being processed by the control module (31), is transmitted through cooperation with other related modules. The setting indicator (38) may show flashing light of a short interval to indicate if operation instructions are normally performed. The LED module (36) is composed of LEDs primarily for illumination. The photographing module (32) and the detection module (34) respectively received in and housed by isolation hoods (39) of a corresponding number. On the opposite surface of the substrate (3), the control module (31) and a main power supply are mounted. The control module (31) generally functions to drive the various modules mounted on the substrate (3). The substrate (3) is generally mounted above the lower housing member (4). An upper housing member (1) comprises a plurality of positioning holes (11) formed therein. The upper housing member (1) is mounted on the lower housing member (4). The isolation hoods (39) help mount and embed the photographing module (32) and the detection module (34) in the positioning holes (11) so that the modules that are arranged on the substrate (3) are each set in an independent area. The isolation hoods (39) may block light and temperature to prevent the modules from interfering with each other.

Figure 1:
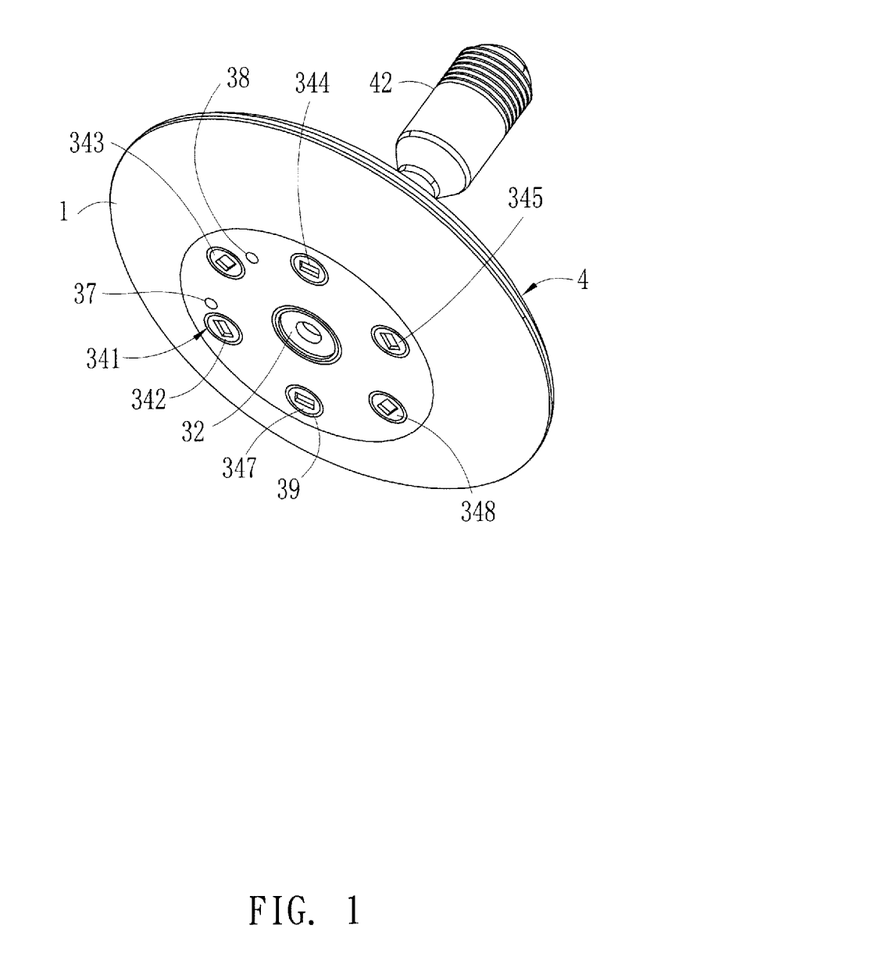
FIG. 1 is a perspective view of the present invention.
Figure 2:
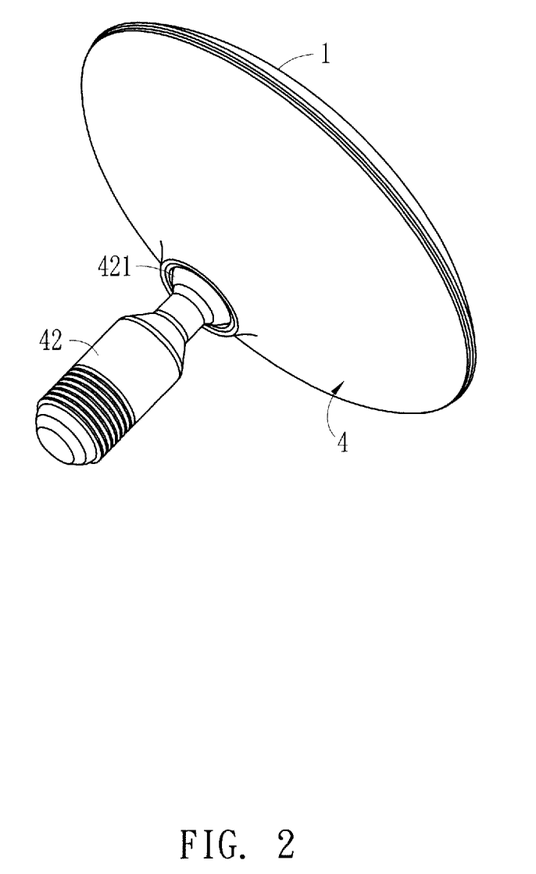
FIG. 2 is another perspective view of the present invention taken from a different angle.
Figure 3:
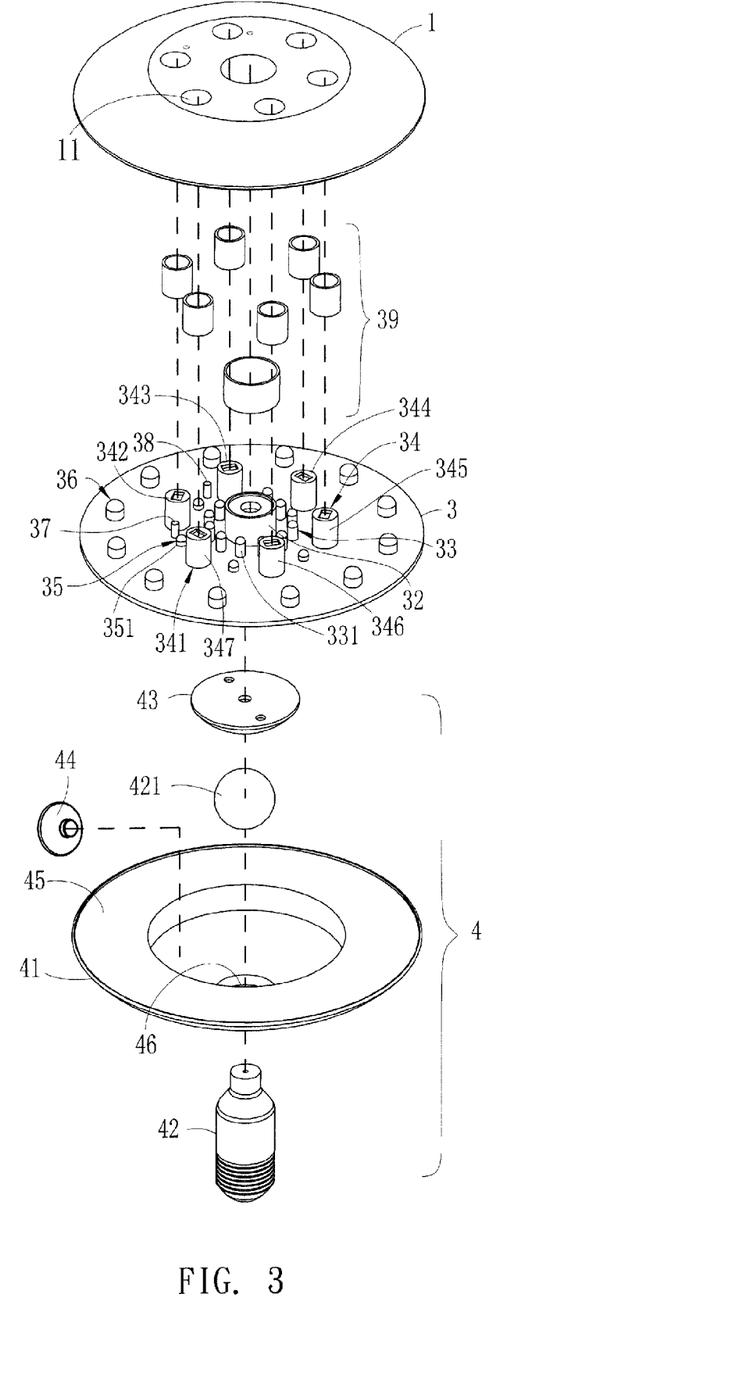
FIG. 3 is an exploded view of the present invention.
Figure 4:
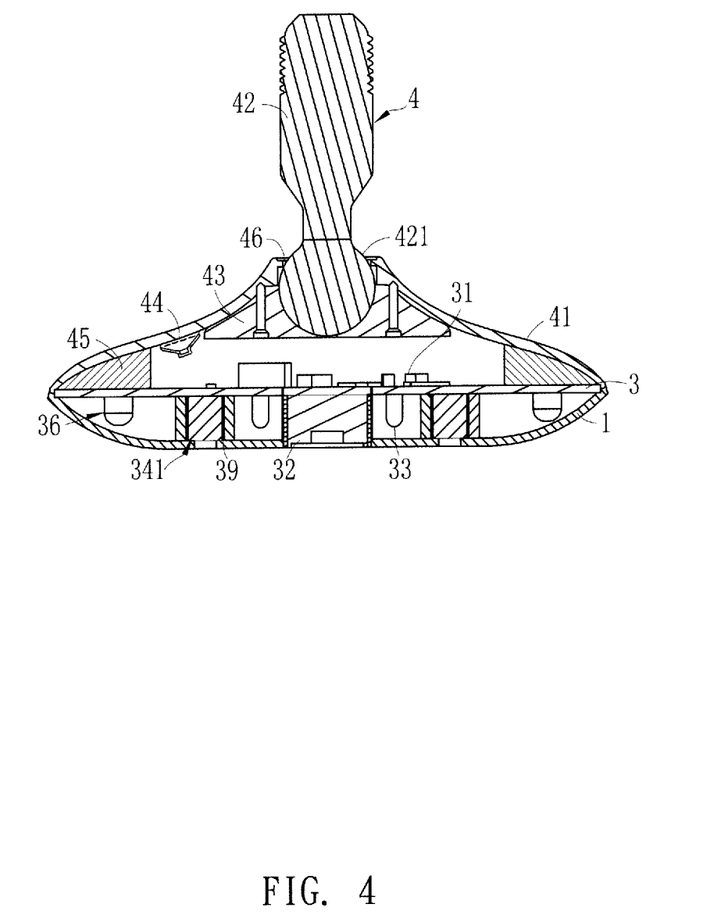
FIG. 4 is a cross-sectional view of the present invention.
Figure 5:
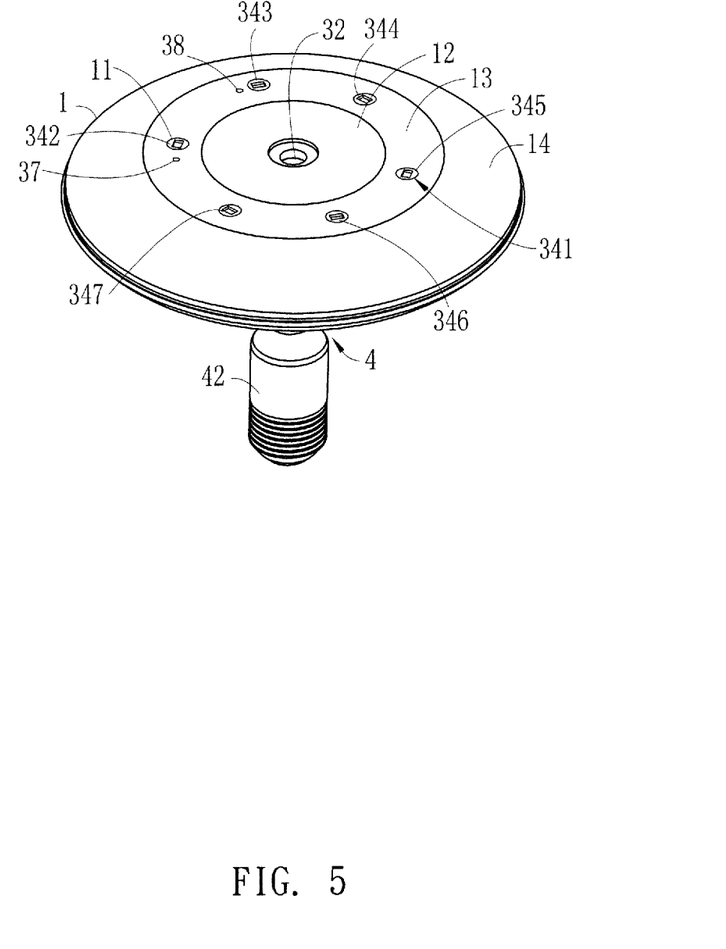
FIG. 5 is a perspective view showing a second embodiment of the present invention.
Figure 6:
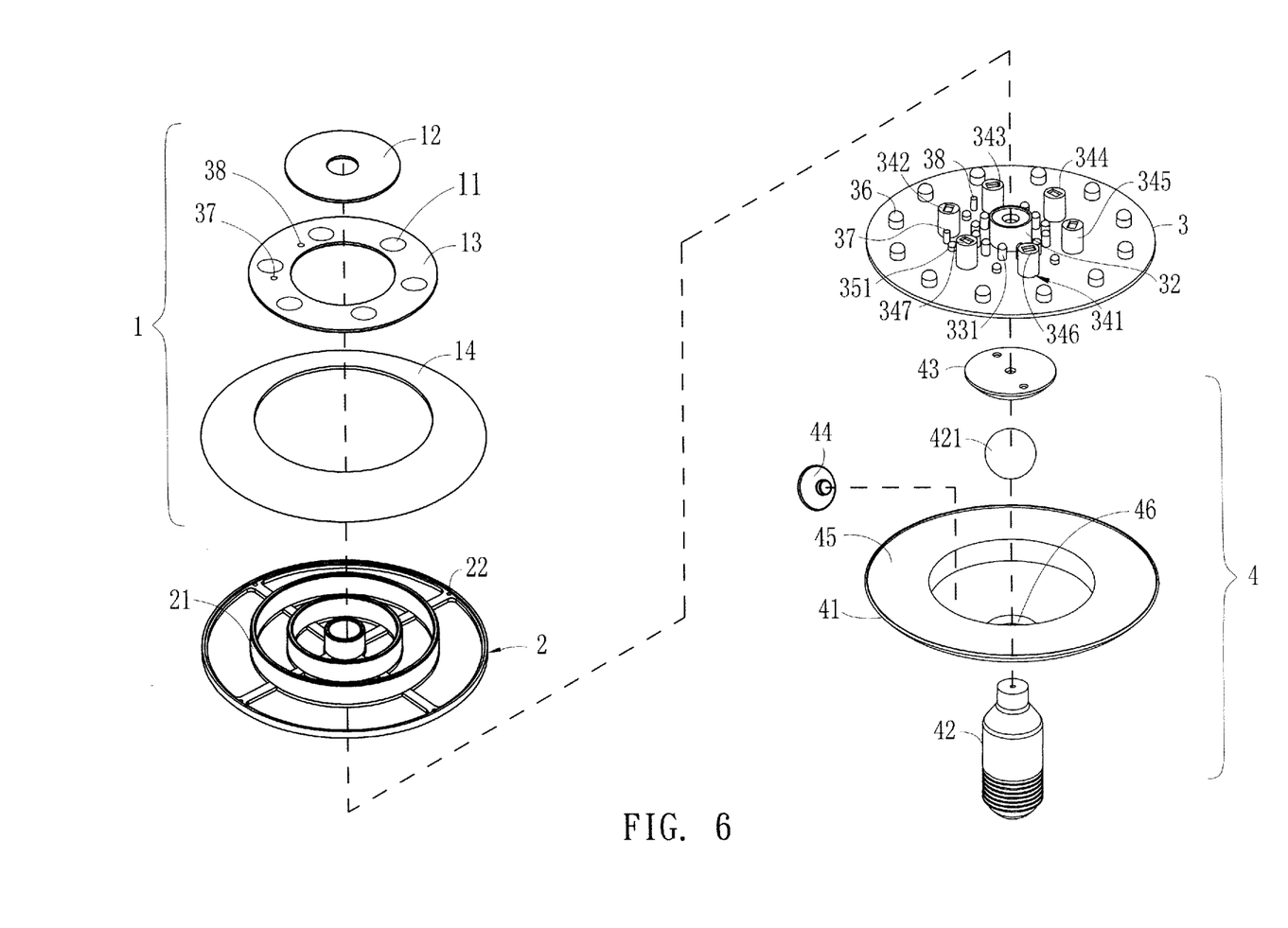
FIG. 6 is an exploded view showing the second embodiment of the present invention.
Figure 7:
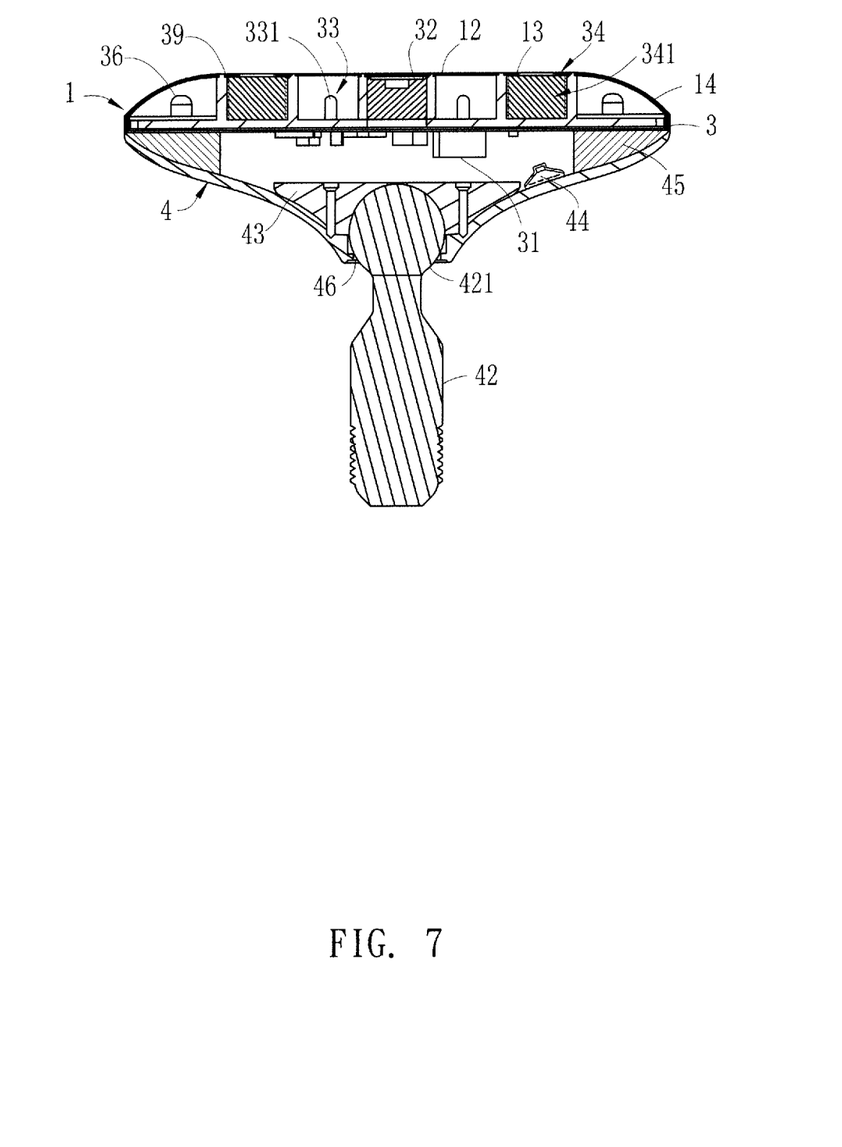
FIG. 7 is a cross-sectional view showing the second embodiment of the present invention.
Figure 8:
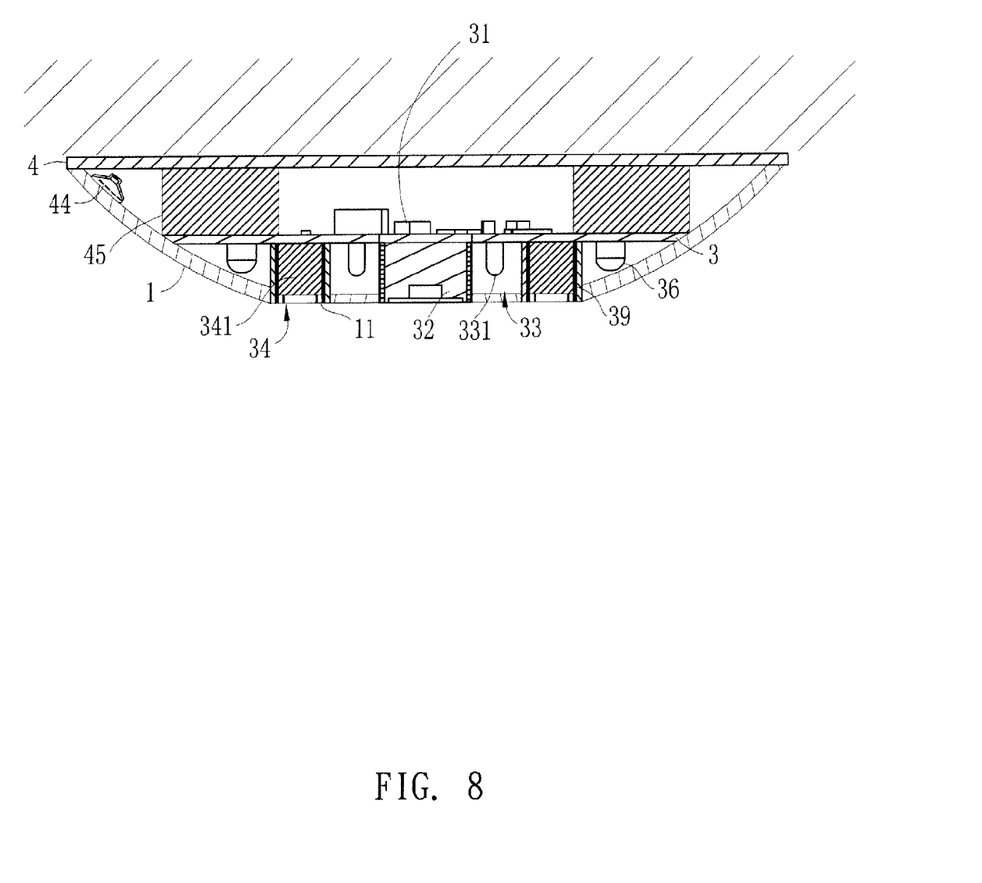
FIG. 8 is a cross-sectional view showing a third embodiment of the present invention.

In another embodiment of the present invention, as shown in FIGS. 5-7, the substrate (3) and the lower housing member (4) are of the same structures as those described with reference to the previous embodiment and a difference resides in that a frame (2) is further provided and the structure of the upper housing member (1) is changed. The frame (2) comprises a plurality of separation walls (21) that forms an annular array. A plurality of threaded holes (22) is formed in an edge of the frame (2) so that the frame (2) may be fixed on the substrate (3) through screwing by means of the threaded holes (22), whereby the separation walls (21) separate the modules on the substrate (3) from each other. The upper housing member (1) is generally composed of an indicator cover (12), a sensor cover (13), and an LED illumination cover (14), which are respectively annular rings of different sizes. The covers are each made to correspond to spacing distances between the separation walls (21). The annular form may also be modified in the design thereof to provide an upper housing member (1) showing a unique configuration. Further, the upper housing member (1) is mounted atop the flame (2) to allow the modules of the substrate (3) to be set in independent areas.

Figure 9:
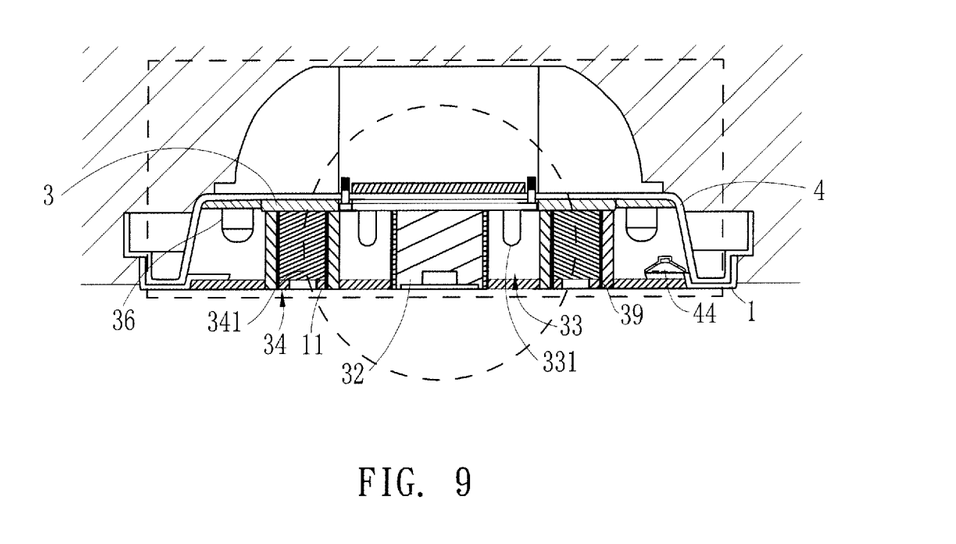
FIG. 9 is a perspective view showing a fourth embodiment of the present invention.
Figure 9A:
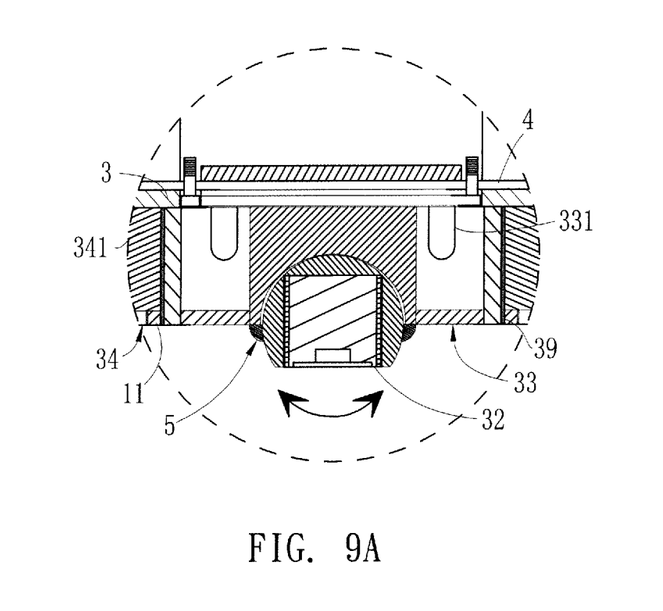
FIG. 9A is an enlarged cross-sectional view of a portion of the fourth embodiment of the present invention.
Figure 10:
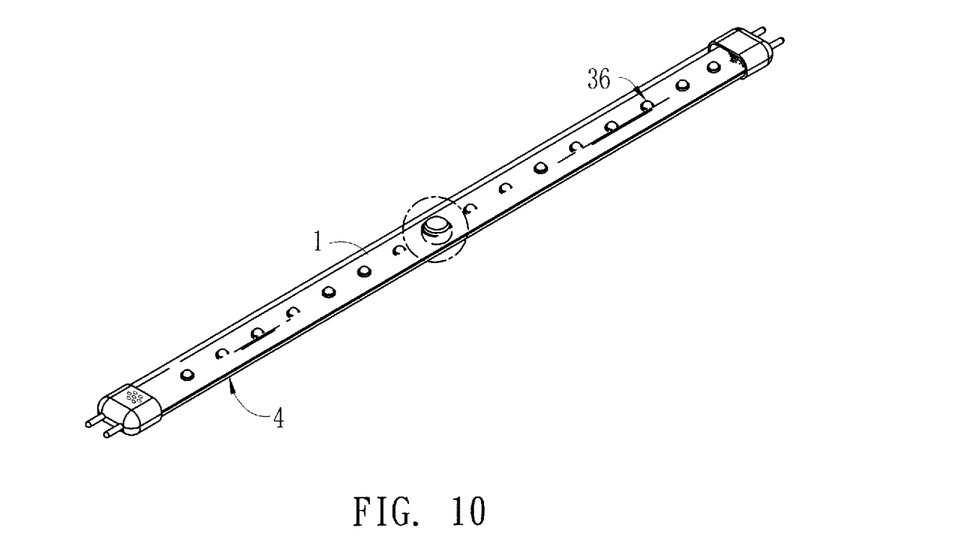
FIG. 10 is a perspective view showing a fifth embodiment of the present invention.
Figure 10A:
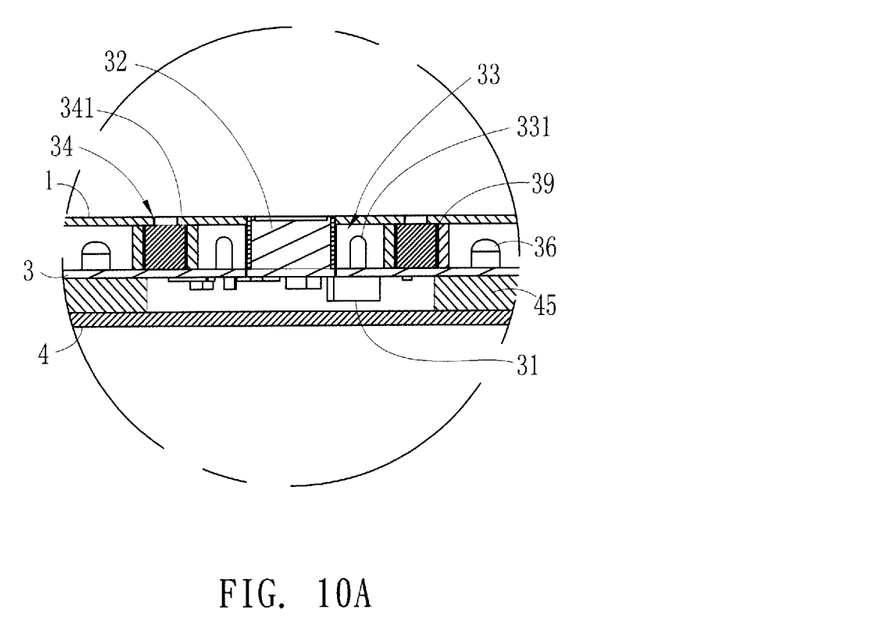
FIG. 10A is an enlarged cross-sectional view of a portion of the fifth embodiment of the present invention.
Figure 11:
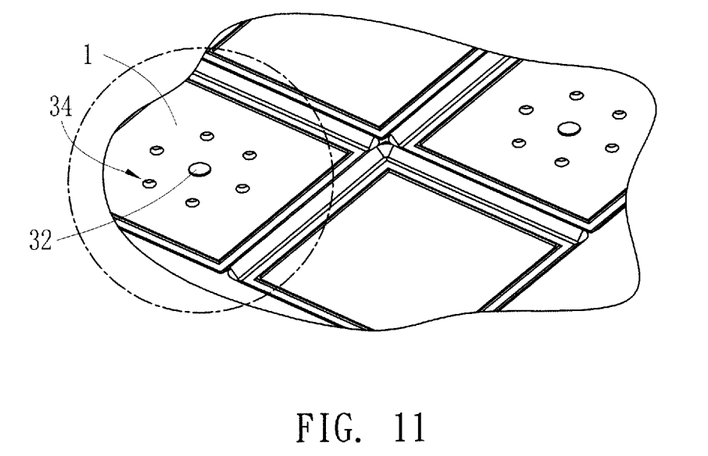
FIG. 11 is a perspective view showing a sixth embodiment of the present invention.
Figure 11A:
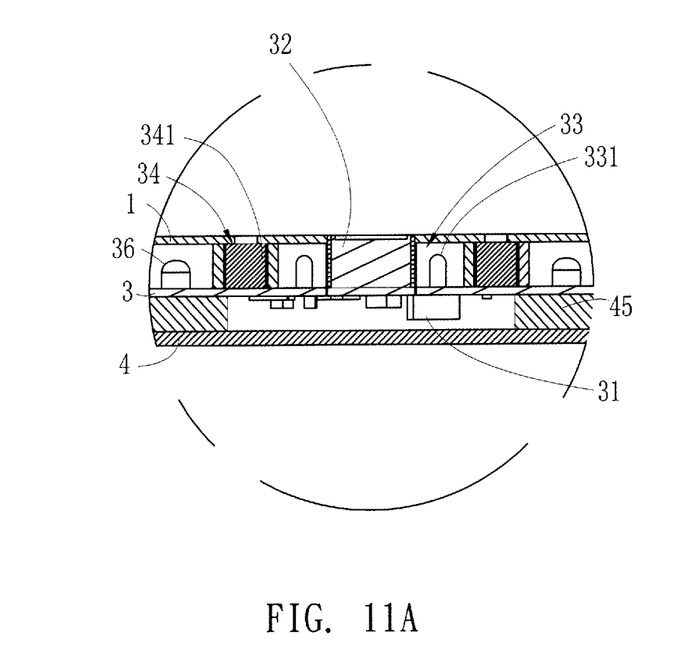
FIG. 11A is an enlarged cross-sectional view of a portion of the sixth embodiment of the present invention.
Figure 12:
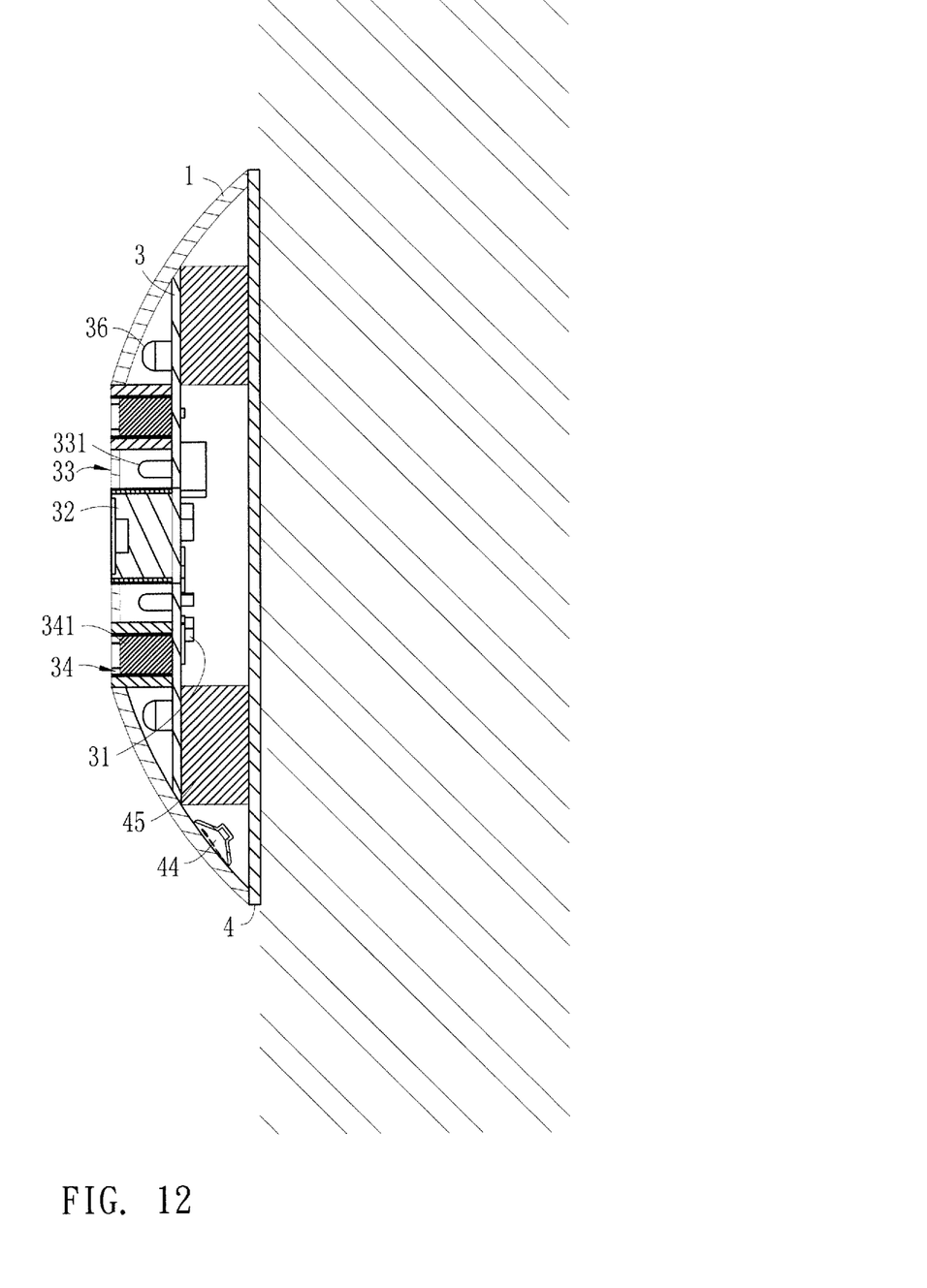
FIG. 12 is a cross-sectional view showing a seventh embodiment of the present invention.

Referring to FIGS. 8-12, the lighting device shown in these drawings are respectively a ceiling light, an embedded light, a fluorescent light tube, an LED panel light, and a wall lamp, wherein the structures discussed above with reference to the two previous embodiments are installed, through minor modifications, in the lighting devices of different kinds, but not limited to these kinds. As shown in FIG. 9A, a rotary spherical seat (5) is mounted to a middle portion of the substrate (3) and the photographing module (32) is mounted in the rotary spherical seat (5) to achieve adjustability of the photographing range and provide a better field of view, but the embodiment is not limited to an embedded light.

In each of the previous embodiments, the control module (31) may further comprise: a photographing module for recording an image, a WIFI and wireless module for remote control, an inspection module for analyzing data of the detection module (34), and a central processor module for control of and connection among the above modules to have them driven to perform related operations. The modules can be changed and replaced at a product supply side according to practical needs. Further, a user or the product supply side may use a mobile application or APP to activate or deactivate the above operations without being limited to any specific type of the modules.

An actual example of activation of the detection module (34) is as follows:

(1) The fuel gas sensor (342) and the air sensor (346): The fuel gas sensor (342) is provided for detecting monoxide and other harmful gases. Gases cannot be identified by the photographing module (32) or bare eyes of human beings and thus related detectors that are available in the market often determines the level of danger according to the concentration of the gases. When fuel gas leaks, the gas moves through the positioning holes (11) to enter the fuel gas sensor (342) so that data of detection is transmitted to the control module (31) and the data is analyzed with the inspection module of the control module (31) to allow the central processor module to determine the level of danger and feed a signal to the flashing alarm light (351) and the speaker (44) to generate audio and video reminders and also to provides an alarm to a user who has made related settings in advance through short message, dialing, or APP. If the reminders receive no response and the concentration of the fuel gas leakage continuously increases to reach a predetermined level of danger, then information is transmitted through a network to a fire department, the information including the current detected gas concentration, addresses, images, or other predetermined data that may help the fire fighters to realize and control the on site situation. The smoke sensor (346) primarily functions to detect the concentration of smoke, and similar to the fuel gas sensor (342) discussed above, the operation is based on the level of danger to determine if to notify the user or the fire department. For a low level of danger, such as smoking cigarettes and burning paper, the photographing module (32) is not activated to make recording of images. For a middle or high level of danger, the photographing module (32) is activated to acquire and transmit related information. In addition, different modes of communication and interconnection can be expanded through updating of the APP, but not limited thereto.

(2) The pressure sensor (343), the temperature/humidity sensor (344), and the air sensor (347) are operable to respond to the pressure, temperature/humidity or harmful fog in the surrounding environment exceeding a predetermined threshold (which can be adjusted according to the default value set up in the APP) so as to have the APP reminding the user of the need for subsequent adjustment operations.

(3) The body temperature sensor (345) is used for the purpose of preventive activation of lighting, prevention of invasion of burglary, or remote control and monitoring and the body temperature sensor (345) can be used to detect the body temperature or movement of a person in the surrounding environment in order to activate the photographing module (32) for image recording and to activate the APP to remind a user, allowing the user to activate, through the APP, subsequent operations, such as an option of reporting to the police station and canceling the image recording operation. Further, the APP may allow the user to proceed with advanced control of the LED module (36) in order to set the LED module in a mode of persistent illumination so as to achieve installations in various environments, such as indoors and outdoors, with the angular position and orientation being adjusted through the lower housing member (4) to achieve a more flexible range of application.

From the above described embodiments, it can be appreciated that the present invention makes use of modularization of a structural arrangement to allow all modules to be components of simplification and collectively integrated on a substrate (3) and to allow the modules to be respectively set in independent areas through the use of an arrangement of an annular array on the substrate (3) for being widely used in various types of lighting device, whereby the control module (31) may be operable to drive each module to carry out a corresponding operation, allowing the present invention to achieve multiple functions of detection, recording, and lighting in multiple ranges and also allowing a product supply side to select and replace components of the sensors (341) and the control module (31) to achieve a purpose of modularization and utilization of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multiple detection function modularized lighting device, comprising:
 a lower housing member for electrical connection with a substrate;
 a photographing module arranged at a center of the substrate, the substrate further comprising an indication module, a detection module, an alarm module, and a light-emitting diode (LED) module arranged thereon along a circumference of the photographing module, the photographing module and the detection module being each received in and housed by an isolation hood, an opposite surface of the substrate comprising a control module mounted thereon, the substrate being mounted on the lower housing member; and
 an upper housing member, which comprises a plurality of positioning holes formed therein, the upper housing member being mounted on the lower housing member, the isolation hoods mounting and embedding the photographing module and the detection module in the positioning holes so that the modules that are arranged on the substrate are each set in an independent area.

2. The multiple detection function modularized lighting device according to claim 1, wherein the lower housing member comprises a base, which comprises a through hole formed through a center thereof; a pivot joint member, which has a front end forming a universal joint; and a pivoting seat, the pivot joint member being received through the center of the base to couple to the pivoting seat so as to be mounted in the base thereby constraining the pivoting seat for rotation for adjustment of angle thereof.

3. The multiple detection function modularized lighting device according to claim 1, wherein the detection module further comprises:
   a fuel gas sensor for detecting a harmful gas;
   a pressure sensor for detecting an air pressure;
   a temperature/humidity sensor for detecting environmental temperature/humidity;
   a body temperature sensor for detecting a temperature or movement of a human body in order to activate lighting of the LED module or image recording of the photographing module;
   a smoke sensor for detecting smoke; and
   an air sensor for detecting content of suspending particles;
   wherein the sensors each detect if a surrounding environmental condition meets a criterion for activation and transmit data to the control module for decision and operation.

4. A multiple detection function modularized lighting device, comprising:
   a lower housing member for electrical connection with a substrate;
   a photographing module arranged at a center of the substrate, the substrate further comprising an indication module, a detection module, an alarm module, and a light-emitting diode (LED) module arranged thereon along a circumference of the photographing module, the photographing module and the detection module being each received in and housed by an isolation hood, an opposite surface of the substrate comprising a control module mounted thereon, the substrate being mounted on the lower housing member;
   a frame, which comprises a plurality of separation walls that forms an annular array, the frame being mounted on the substrate in order to separate the modules on the substrate from each other; and
   an upper housing member, which comprises an indicator cover, a sensor cover, and an LED illumination cover, the covers being each made to correspond to spacing distances between the separation walls and forming annular rings of different sizes, the upper housing member being mounted atop the frame to allow the modules of the substrate to be set in independent areas.

5. The multiple detection function modularized lighting device according to claim 4, wherein the lower housing member comprises a base, which comprises a through hole formed through a center thereof; a pivot joint member, which has a front end forming a universal joint; and a pivoting seat, the pivot joint member being received through the center of the base to couple to the pivoting seat so as to be mounted in the base thereby constraining the pivoting seat for rotation for adjustment of angle thereof.

6. The multiple detection function modularized lighting device according to claim 4, wherein the detection module further comprises:
   a fuel gas sensor for detecting a harmful gas;
   a pressure sensor for detecting an air pressure;
   a temperature/humidity sensor for detecting environmental temperature/humidity;
   a body temperature sensor for detecting a temperature or movement of a human body in order to activate lighting of the LED module or image recording of the photographing module;
   a smoke sensor for detecting smoke; and
   an air sensor for detecting content of suspending particles;
   wherein the sensors each detect if a surrounding environmental condition meets a criterion for activation and transmit data to the control module for decision and operation.

\* \* \* \* \*